INVENTOR.
BURTON D. MORGAN
BY
Oldham & Oldham
ATTORNEYS.

United States Patent Office 3,547,751
Patented Dec. 15, 1970

3,547,751
HONEYCOMB CORE MADE FROM SEALED
CONTINUOUS THERMOPLASTIC SHEETS
Burton D. Morgan, 302 Aurora St.,
Hudson, Ohio 44236
Filed May 2, 1967, Ser. No. 635,501
Int. Cl. B32b 3/12
U.S. Cl. 161—68                        3 Claims

ABSTRACT OF THE DISCLOSURE

A structural material comprising two sheets of a formable plastic, normally, at least, semi-rigid, sealed together in an embossed pattern to produce closed cells, which includes the means to develop pressure within the cells with the sheets of material positioned between spaced outer skins which are retained in position under the influence of temperature causing the cells to expand until restrained from further expansion by the skins and wherein the skins are shaped and adhered to the expanded sheets to set in the produced shape. The process for making the material, as well as the material itself is described.

---

The general object of the invention is to produce a structural material which will be economical to manufacture, have high strength characteristics and represent an improvement in cost, durability, strength and life over the existing structural materials in the art.

For better understanding of the invention, reference should be made to the accompanying drawings wherein.

Figure 1:
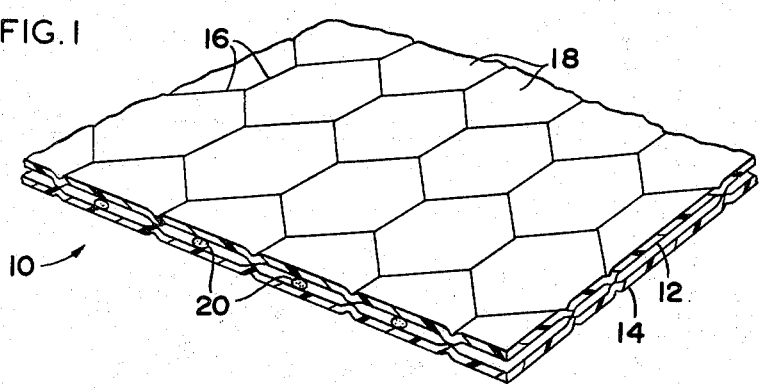
FIG. 1 is a broken away cross-sectional perspective illustration of the core material of the structure in unblown, but embossed condition.

With reference to the form of the invention illustrated in the drawings, the numeral 10 illustrates generally a core material comprising two sheets 12 and 14, respectively, made of formable but normally, at least, semi-rigid plastic, polyvinyl chlorides, nylon, etc., examples of which would be suitable vinyl which preferably are thermoplastic that can be heat sealed, or otherwise appropriately secured together in an embossed pattern aling lines 16. A regular hexagonal embossed pattern is illustrated although it should be understood that almost any pattern would be suitable. In any event, the sealing along line 16 must produce closed cells 18 which are substantially fluid or air tight. To form the material of the invention, it is contemplated that some means must be provided to pressurize and expand the cells 18. One suitable way to achieve this end would be for each cell to contain some chemical which can be turned into gas upon the application of heat for example. To this end, and as an embodiment of the invention a pill 20 is inserted into each cell before the embossed sealing process defining the cells, which pills are of the type conventionally used in forming tennis balls, for example. The pills 20 preferably are reactive to heat and turn into gas to achieve the desired pressurization, and, of course, only to a sufficient pressure to achieve the blowing desired as more fully defined below. These pills are made from azobisisobutyronitrile and manufactured by National Polychemicals Inc., for example.

Figure 2:
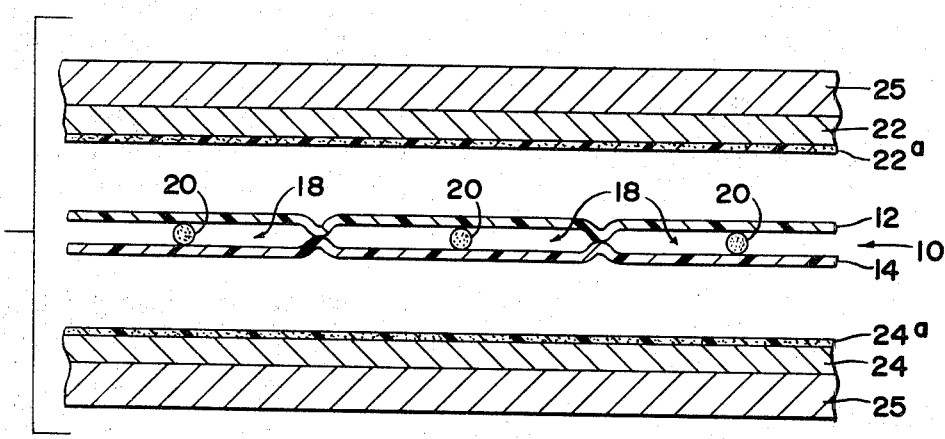
FIG. 2 is an enlarged broken away elevation of the core positioned between the outer skins which are retained in position thereby defining a blowing chamber.

FIG. 2 illustrates the sheets 12 and 14 in their embossed form positioned between outer skins 22 and 24, respectively. The skins are structurally restrained by a frame 25 to define a blowing chamber, for a fixed structural limitation to the blowing of the core 10, as more fully defined hereinafter. Also, in order to provide an adherence of skins 22 and 24 to the core 10, as it contacts therewith during the blowing, suitable layers of heat or pressure sensitive adhesive 22ª and 24ª are positioned on the internal surfaces of the respective skins.

Figure 3:
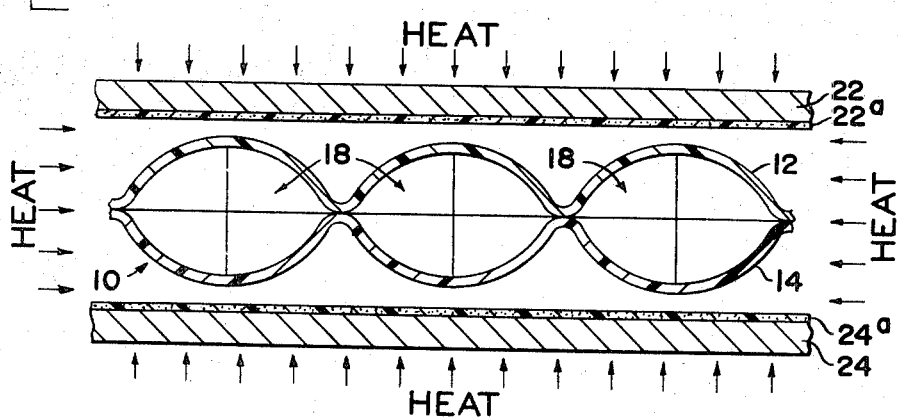
FIG. 3 is an enlarged cross-sectional elevation, similar to FIG. 2, indicating the application of heat, causing a blowing or pressure increase in the cells formed in the core.

With the core 10 positioned internally or between the skins 22 and 24, and with the pills 20 being reactive to heat, the application of heat, as indicated in FIG. 3, causes the pills to vaporize and turn to gas which in turn causes pressurization and consequent expansion of the respective cells 18, as is clearly indicated. Also, it should be understood that the sheets 12 and 14 of plastic are initially flexible but semi-rigid, at least of a thermoplastic quality so they may be expanded with the plastic forming the sheets cured or set under the influence of heat and pressure to conform to a final configuration shown in FIG. 4. Note that in FIG. 4, the walls of the cells which are transverse or substantially perpendicular to the skins 22 and 24 are folded back on themselves, while the surfaces flush or parallel to the skins 22 and 24 are securely adhered to the adhesive layers 22 and 24 respectively.

It is anticipated that the pressure within the cells 18 will remain at least sufficiently long to allow the sheets 12 and 14 to cool and become rigid in their new thermoplastically formed positions to provide the desired structural material of the invention.

Naturally, it should be understood that the skins 22 and 24 might be backed up by a suitable structural form of a contoured shape rather than the flat shape of frame 25 so that they will remain in the desired spaced relationship allowing for the blowing of the core 10, and the full formation thereof to the contoured shape dictated by the form.

Figure 4:
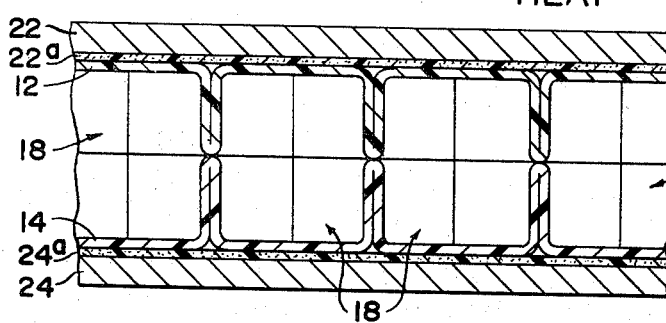
FIG. 4 illustrates the complete formation of the core to the full-blown condition, restrained by the skins and forming the final material.

The invention contemplates that if the structural material of the invention is to be used as a replacement for corrugated cardboard, for example, that the skins 22 and 24 will be made from a heavy paper with suitable pressure sensitive adhesive for paper or fibrous material comprising the layers 22ª and 24ª. In this situation, the rigid plastic sheets 12 and 14 would conceivably have a thickness in the range of between about .002 inch to about .010 inch and thus easily be formed by the application of heat and pressure to the cells 18 defined above so that the final configuration shown in FIG. 4 is easily achieved. The overall thickness of the structural material formed from a sheet of this type might be anywhere from approximately one-eighth inch to one-half inch in thickness. However, it should be understood that the thickness of the structural material formed with the core 10 of the invention is limited only by the materials utilized in the thermosplastic sheets forming the core, and the amount of pressure inserted to the respective cells to achieve a complete blowing to substantially the configuration shown in FIG. 4 of the drawings.

The invention is not limited to inserting the pressure within the cells 18 by utilizing the pills 20, but conceivably any method of inserting the pressure would meet the desired objects. For example, one of the sheets 12 or 14 could be coated entirely thereover with a blowing chemical which is pushed aside during the embossing operation, but is activated under the influence of heat. Also, of course, the pressure could be applied from an external pressure source through convenient means with sealing afterwards.

Any convenient means of applying heat to the structure to achieve the desired blowing effect might be utilized, and a typical example would be a suitable form of radio frequency heating. Also, it should be understoond that by using certain materials in the sheets 12 and 14, and proper temperatures to achieve the blowing, it is possible to cause the surfaces of the transverse sections which fold back onto each other to adhere to each other during the blowing operation so as to further increase the strength of the structure.

As pointed out above, but further in the way of explanation, the pressure inserted within the cells 18 must be of such a nature that when the heat is removed, there will not be a condensing into a vacuum, but that at least a partial pressure would be retained to hold the structure into shape until the sheets are cooled sufficiently to rigidize in their newly formed shapes.

In most circumstances, however, the pressure will eventually disappear within the cells, and the strength of the material will be only the strength of the core 10 in its formed condition in combination with the outer skins 22 and 24.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A structural material which comprises a honeycomb core, an outer skin surrounding and adhered to the core which is characterized by the core being formed from at least a piar of rigid continuous thermoplastic sheets sealed together to form a plurality of cells from areas of the sheets, which cells have walls defining a geometric shape and wherein the cell walls of each of the sheets in a direction substantially perpendicular to the skin are folded back on themselves to form a double thickness, substantially one-half of each cell being formed by each of the two sheets and the two sheets being adhered to each other where they are in contact.

2. A material according to claim 1 where the sheets are heat sealed together at limited areas thereof to define the cells by embossing thereof in a regular pattern.

3. A material as in claim 1 where an outer skin made from paper is adhered to each of said sheets by an adhesive.

References Cited
UNITED STATES PATENTS

| | | | |
|---|---|---|---|
| 2,474,035 | 6/1949 | Crandon | 156—497X |
| 2,477,852 | 8/1949 | Bacon | 161—68 |
| 2,621,138 | 12/1952 | Messing | 156—209 |
| 2,739,093 | 3/1956 | Bull | 156—81X |
| 2,978,006 | 4/1961 | Clemens | 161—127X |
| 3,011,930 | 12/1961 | Dworak | 161—127X |
| 3,349,990 | 10/1967 | Woodford | 229—14X |
| 3,415,711 | 12/1968 | Chavannes | 161—68 |

JOHN T. GOOLKASIAN, Primary Examiner

H. F. EPSTEIN, Assistant Examiner

U.S. Cl. X.R.

161—69, 127